(12) United States Patent  (10) Patent No.: US 8,309,199 B2
Mizutani  (45) Date of Patent: Nov. 13, 2012

(54) HONEYCOMB STRUCTURE

(75) Inventor: Takashi Mizutani, Tokoname (JP)

(73) Assignee: NGK Insulators, Ltd., Nagoya (JP)

( * ) Notice: Subject to any disclaimer, the term of this patent is extended or adjusted under 35 U.S.C. 154(b) by 651 days.

(21) Appl. No.: 12/481,361

(22) Filed: Jun. 9, 2009

(65) Prior Publication Data

US 2009/0246455 A1  Oct. 1, 2009

Related U.S. Application Data

(63) Continuation of application No. PCT/JP2007/073943, filed on Dec. 12, 2007.

(30) Foreign Application Priority Data

Feb. 2, 2007 (JP) ................. 2007-024104

(51) Int. Cl.
B32B 3/12 (2006.01)
(52) U.S. Cl. ...................................... 428/116
(58) Field of Classification Search .................. None
See application file for complete search history.

(56) References Cited

U.S. PATENT DOCUMENTS

| | | | |
|---|---|---|---|
| 6,395,370 B1 | 5/2002 | Noda et al. | |
| 6,596,666 B1 | 7/2003 | Yamada | |
| 2003/0053940 A1 | 3/2003 | Harada et al. | |
| 2004/0128991 A1 | 7/2004 | Sakamoto | |
| 2005/0011174 A1 | 1/2005 | Hong et al. | |
| 2005/0016140 A1 | 1/2005 | Komori et al. | |
| 2005/0016141 A1 | 1/2005 | Hong et al. | |
| 2005/0102984 A1 | 5/2005 | Bardon et al. | |
| 2005/0191461 A1 | 9/2005 | Kasai et al. | |
| 2006/0150597 A1 | 7/2006 | Masukawa et al. | |
| 2007/0009707 A1 | 1/2007 | Ogura et al. | |
| 2007/0227109 A1 | 10/2007 | Hong et al. | |
| 2007/0240396 A1 | 10/2007 | Mizutani | |
| 2008/0014405 A1 | 1/2008 | Sakamoto | |
| 2008/0034744 A1 | 2/2008 | Bardon et al. | |
| 2008/0086993 A1 | 4/2008 | Komori et al. | |

FOREIGN PATENT DOCUMENTS

| | | |
|---|---|---|
| FR | 2 789 327 A1 | 8/2000 |
| JP | A-2001-138416 | 5/2001 |
| JP | A-2001-206780 | 7/2001 |
| JP | A-2003-227327 | 8/2003 |

(Continued)

OTHER PUBLICATIONS

New U.S. Patent Application filed Jun. 9, 2009 in the name of Takashi Mizutani.

(Continued)

Primary Examiner — David Sample
(74) Attorney, Agent, or Firm — Oliff & Berridge, PLC

(57) ABSTRACT

The honeycomb structure comprising a plurality of columnar honeycomb segments in which two kinds of plural through-holes different in end face area are formed side by side by being surrounded by partition walls, each honeycomb segment having, at one end face, an inlet side of high opening ratio, wherein through-holes of smaller end face area are plugged and, at other end face, an outlet side of low opening ratio and wherein through-holes of larger end face area are plugged, the plurality of honeycomb segments being bonded to each other via a bonding material in the longitudinal direction of each honeycomb segment. The bonded width of the bonding material is larger at the inlet side end face of the honeycomb structure than at the outlet side end face is presented.

4 Claims, 3 Drawing Sheets

FOREIGN PATENT DOCUMENTS

| | | |
|---|---|---|
| JP | A-2004-283669 | 10/2004 |
| JP | A-2005-512782 | 5/2005 |
| JP | A-2005-270969 | 10/2005 |
| JP | A-2007-014886 | 1/2007 |
| WO | WO 01/93984 A1 | 12/2001 |
| WO | WO 2004/024293 A1 | 3/2004 |
| WO | WO 2005/089902 A1 | 9/2005 |
| WO | WO 2006/027487 A1 | 3/2006 |
| WO | WO 2006/126507 A1 | 11/2006 |

OTHER PUBLICATIONS

Extended European Search Report dated Jul. 25, 2011 in European Patent Application No. 07850494.1.

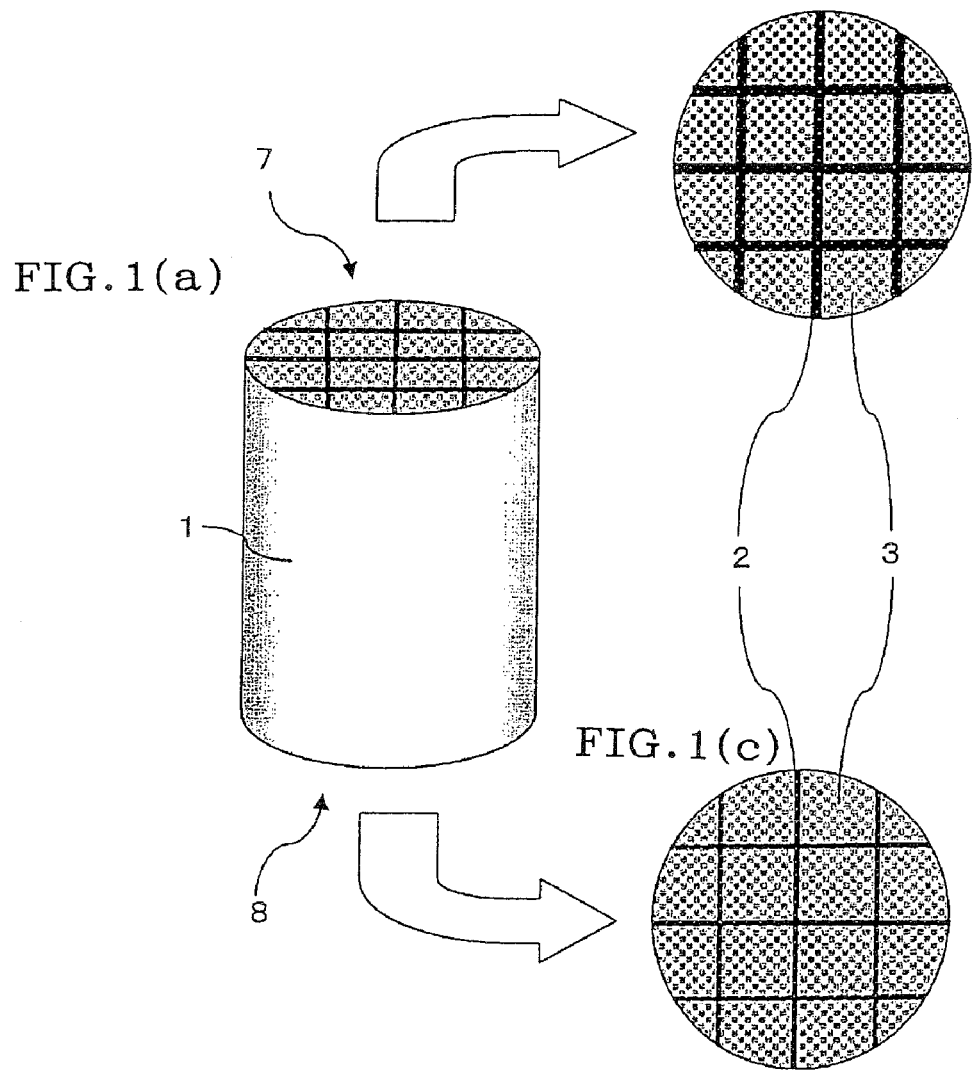

HONEYCOMB STRUCTURE

This is a Continuation of International Application No. PCT/JP2007/073943 filed Dec. 12, 2007, which claims the benefit of Japanese Application No. 2007-024104 filed Feb. 2, 2007. The disclosures of the prior applications are hereby incorporated by reference herein in their entirety.

TECHNICAL FIELD

The present invention relates to a honeycomb structure. More particularly, the present invention relates to a honeycomb structure which is different in opening ratio between the fluid inlet side and the fluid outlet side and wherein the inlet side which has higher opening ratio has a higher structural rigidity.

BACKGROUND ART

Catalyst component-loaded honeycomb structures have been used in exhaust gas purification devices for heat engine (e.g. internal combustion engine) or burner (e.g. boiler), reformers of liquid fuel or gaseous fuel, etc. Also, it is known to use a honeycomb structure as a filter for capture and removal of the particulate matter contained in a particle-containing fluid such as exhaust gas discharged from diesel engine.

In such honeycomb structures used for the above purpose, non-uniform temperature distribution tends to appear inside owing to the sudden temperature change of exhaust gas or the local heat generation, which has caused problems such as cracking. In order to alleviate these problems, it was proposed to constitute a honeycomb structure in an integral structure of a plurality of honeycomb segments, by bonding individual honeycomb segments with an elastic bonding material, to relax the thermal stress applied to the structure.

In such a honeycomb structure formed by bonding a plurality of honeycomb segments, the outer wall of each honeycomb segment (to become a surface contacting with other honeycomb segments) was smooth. As a result, the bonding strength between honeycomb segments was weak, which has often caused, owing to the vibration or the exhaust gas pressure during the use, the loosening, movement or separation of honeycomb segments.

In view of the above situation, there was proposed a honeycomb structure of high durability formed by bonding, with a bonding material, a plurality of honeycomb segments each having a large number of through-holes which extended in the axial direction of honeycomb segment and which were surrounded by partition walls, in which honeycomb structure the smoothness of the outer wall of each honeycomb segment (to become a surface contacting with other honeycomb segments) was set at a particular level so that there was no movement of each honeycomb segment during the use owing to the vibration or the exhaust gas pressure (Patent Literature 1).

Cracking caused by thermal stress can be prevented to some extent by employment of honeycomb segments. However, it is considered that if each segment could have higher durability to thermal stress, reduction in cost or increase in regeneration efficiency could be possible owing to the reduction in the number of segments used.

In view of the above matter, there was proposed a honeycomb structure formed in one piece, using a plurality of honeycomb segments each having an outer wall, partition walls provided inside the outer wall, and a large number of through-holes (fluid passages) extending in the axial direction of honeycomb segment, surrounded by the partition walls, which honeycomb structure comprised honeycomb segments in which, in their sections vertical to the axial direction of honeycomb structure, each partition wall had an angle of 25° to 65° to a straight line along the outermost point of the outer wall contacting with other honeycomb segment and therefore which honeycomb structure had superior durability to cracking caused by thermal stress (Patent Literature 2).

Patent Literature 1: JP-A-2001-138416
Patent Literature 2: JP-A-2003-227327

DISCLOSURE OF THE INVENTION

When a diesel particulate filter (DPF) made of a honeycomb structure is mounted vertically around the turbocharger outlet of engine, a retainer ring is fitted thereto in many cases, in order to prevent the movement of DPF caused by the self weight, vibration, etc. of the DPF. In such a case, the strength of the retainer ring for tightening the DPF is set downstream of the DPF and the same strength is applied upstream of the DPF sometimes. FIG. 8 is a schematic drawing showing a part (right upper corner) of a honeycomb structure canned with a retainer ring. A honeycomb structure 1 is provided with a retainer ring 32 and canned in a DPF holder 31 via a mat 33. Owing to the canning, the honeycomb structure 1 receives a surface pressure 34. The surface pressure 34 is large near the retainer ring 32.

Meanwhile, in a DPF having a high opening ratio at the inlet side, designed to reduce the pressure loss after particle capture, there is a problem that the high opening ratio at the inlet side makes the structural strength of the inlet side small and use, at the inlet side, of the same tightening strength as at the outlet side may lead to breakage.

The present invention has been made in view of the above-mentioned problems of the prior art. The present invention aims at providing a honeycomb structure which is different in opening ratio between the fluid inlet side and the fluid outlet side and wherein the inlet side of higher opening ratio has a higher structural rigidity.

The present inventors made a study in order to achieve the above aim. As a result, the present inventors found that the above aim could be achieved by making large the bonded width at the inlet side to increase the structural strength and prevent the breakage during the tightening of retainer. The finding has led to the completion of the present invention.

The present invention provides a honeycomb structure shown below.

[1] A honeycomb structure comprising a plurality of columnar honeycomb segments in which two kinds of plural through-holes different in end face area are formed side by side by being surrounded by partition walls, each honeycomb segment having, at one end face, an inlet side of high opening ratio wherein through-holes of smaller end face area are plugged and, at other end face, an outlet side of low opening ratio wherein through-holes of larger end face area are plugged, the plurality of honeycomb segments being bonded to each other via a bonding material in the longitudinal direction of each honeycomb segment, in which honeycomb structure the bonded width of the bonding material is larger at the inlet side end face of the honeycomb structure than at the outlet side end face.

[2] A honeycomb structure according to [1], wherein, in the following formula (1), $0 < \alpha < 0.7$ and $0.3 < W_{Out} < 2.5$ mm are satisfied.

$$W_{In} = \alpha \times \{(1 - OFA_{In})/(1 - OFA_{Out})\} + W_{Out} \qquad (1)$$

[In the formula (1), $W_{In}$ is a bonded width at inlet side, $W_{Out}$ is a bonded width at outlet side, $OFA_{In}$ is an opening ratio at inlet side, and $OFA_{Out}$ is an opening ratio at outlet side.]

[3] A honeycomb structure according to [1] or [2], wherein the end face area of each honeycomb segment is smaller at the inlet side than at the outlet side.

[4] A honeycomb structure according to any one of [1] to [3], wherein, in the following formula (2), $0<\alpha<0.7$ and $900<Seg_{Out}<3,600$ mm$^2$ are satisfied.

$$Seg_{In}=\alpha \times \{(1-OFA_{In})/(1-OFA_{Out})\} \times Seg_{Out} \quad (2)$$

[In the formula (2), $Seg_{In}$ is an end face area at the inlet side of honeycomb segment, $Seg_{Out}$ is an end face area at the outlet side of honeycomb segment, $OFA_{In}$ is an opening ratio at inlet side, and $OFA_{Out}$ is an opening ratio at outlet side.]

In a honeycomb structure wherein the opening ratio is higher at the inlet side of fluid than at the outlet side, the structural rigidity of plugged portion is lower at the inlet side than at the outlet side; therefore, when the honeycomb structure is pressed at the outer circumference during canning (particularly in the presence of a retainer ring), breakage may occur at the end face. However, the structural rigidity of such a honeycomb structure can be enhanced by enlarging the thickness of the bonded material portion which is high in density and strength.

BRIEF EXPLANATION OF THE DRAWINGS

FIG. 1 is a schematic drawing showing an embodiment of the honeycomb structure of the present invention.

FIG. 2 is a schematic plan view (of inlet side) showing an embodiment of each honeycomb segment constituting the honeycomb structure of the present invention.

EXPLANATION OF SYMBOLS

1 is a honeycomb structure; 2 is a bonding material; 3, 3a and 3b are each a honeycomb segment; 4, 4a, 4b, 5, 5a and 5b are each a though-hole (a cell); 6 is a partition wall; 7 is an inlet side; 8 is an outlet side; 21 is a belt; 22 is a plugged portion; 31 is a DPF holder; 32 is a retainer ring; 33 is a mat; and 34 is a surface pressure.

BEST MODE FOR CARRYING OUT THE INVENTION

The best mode for carrying out the present invention is described below. However, the present invention is not restricted to the following embodiments, and it should be construed that the following embodiments can be subjected to appropriate changes, modifications, etc. based on the ordinary knowledge possessed by those skilled in the art as long as there is no deviation from the gist of the present invention and that even such changed or modified embodiments fall in the scope of the present invention.

The present invention is briefly described with reference to FIGS. 1 to 4.

In the present invention, the honeycomb structure refers to a structure having a large number of through-holes (cells) extending in the axial direction, surrounded by partition walls. FIG. 1 is a schematic drawing showing an embodiment of the honeycomb structure of the present invention. As shown in FIG. 1, the honeycomb structure 1 is constituted by bonding a plurality of honeycomb segments 3 with a bonding material 2.

Figure 3:
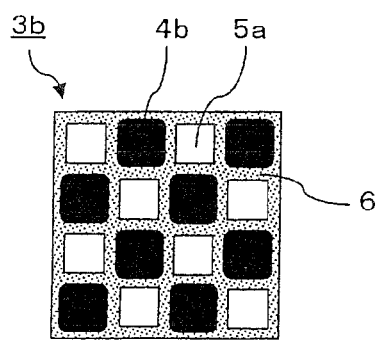
FIG. 3 is a schematic plan view (of outlet side) showing an embodiment of each honeycomb segment constituting the honeycomb structure of the present invention.

The detail of each honeycomb segment is shown in FIGS. 2 and 3. FIG. 2 is a plan view when an embodiment of each honeycomb segment constituting the honeycomb structure of the present invention has been seen from the inlet side of fluid passage, and FIG. 3 is a plan view when an embodiment of each honeycomb segment constituting the honeycomb structure of the present invention has been seen from the outlet side of fluid passage. As shown in FIGS. 2 and 3, each honeycomb segment (3a, 3b) is constituted by arranging two kinds of cells (4a, 4b, 5a, 5b) having different sectional areas in the segment section vertical to fluid passage, alternately in a checkered pattern via partition walls 6. As shown in FIG. 2, each cell 5b having a smaller sectional area is plugged at the inlet side of fluid passage; meanwhile, as shown in FIG. 3, each cell 4b having a larger sectional area is plugged at the outlet side of fluid passage. Therefore, the opening ratio at end face is higher at the inlet side of fluid passage 6 shown in FIG. 2 than at the outlet side of fluid passage shown in FIG. 3.

Figure 4:
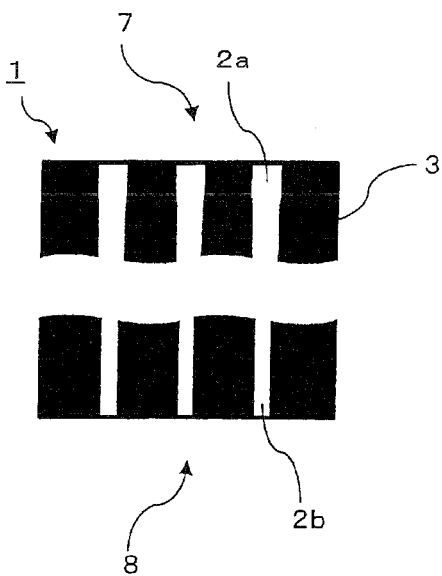
FIG. 4 is a schematic vertical sectional view showing an embodiment of the honeycomb structure of the present invention.

FIG. 4 is a schematic sectional view of an embodiment of the honeycomb structure of the present invention when the embodiment has been cut along the fluid passage direction and the middle portion thereof has been omitted. In FIG. 4, the honeycomb structure 1 is constituted by bonding a plurality of honeycomb segments 3 with a binding material 2a or 2b. As shown in FIGS. 1 and 4, in the present invention, the bonded width of the bonding material (2, 2a or 2b) is large at the inlet side 7 and small at the outlet side 8. Here, the bonded width refers to an average of the widths of the middle parts of the four bonded material portions contacting with the four sides of each segment at each end face of segment.

Figure 5:
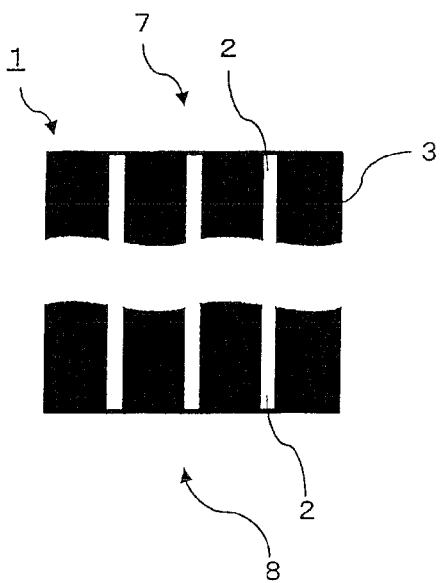
FIG. 5 is a schematic vertical sectional view of a honeycomb structure according to the prior art.
Figure 6:
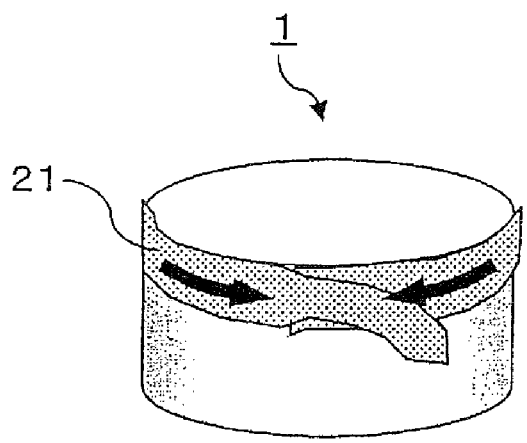
FIG. 6 is a perspective view showing a state of the tightening test.

Meanwhile, in the honeycomb structure of the prior art, the bonded width is the same at the inlet side and the outlet side. FIG. 5 is a schematic sectional view of the honeycomb structure of the prior art when, in the same manner as in FIG. 4, the structure has been cut along the fluid passage direction and the middle portion thereof has been omitted. In FIG. 5, the bonded width of the bonding material 2 of the honeycomb structure 1 is the same at the inlet side 7 and the outlet side 8.

In the honeycomb structure of the present invention, it is preferred that, in the following formula (1), $0<\alpha<0.7$ and $0.3<W_{Out}<2.5$ mm are satisfied.

$$W_{In}=\alpha \times \{(1-OFA_{In})/(1-OFA_{Out})\} \times W_{Out} \quad (1)$$

[$W_1$, is a bonded width at inlet side, $W_{Out}$ is a bonded width at outlet side, $OFA_{In}$ is an opening ratio at inlet side, and $OFA_{Out}$ is an opening ratio at outlet side.]

When the bonded width at outlet side, $W_{Out}$ is 0.3 mm or less, the bonded material portion is unable to sufficiently relax the thermal expansion of segment when the deposited particles are regenerated, whereby cracking tends to appear. When the bonded width at outlet side, $W_{Out}$ is 2.5 mm or more, the fluid passages have a small sectional area, which tends to give a large pressure loss.

In the honeycomb segments constituting the honeycomb structure of the present invention, it is preferred that the end face area is smaller at the inlet side than at the outlet side.

When α is 0 or less, a larger amount of particles (soot) deposit downstream of the inlet cells; therefore, the temperature of downstream side becomes very high during regeneration and risk of crack generation is high. When α is 0.7 or more, the cell opening ratio is too small and a rise in pressure loss tends to appear.

In the present invention, it is further preferred that, in the following formula (2), $0<\alpha<0.7$ and $900<\text{Seg}_{Out}<3,600$ mm$^2$ are satisfied.

$$\text{Seg}_{In}=\alpha\times\{(1-OFA_{In})/(1-OFA_{Out})\}\times\text{Seg}_{Out} \quad (2)$$

[$\text{Seg}_{In}$ is an end face area at the inlet side of honeycomb segment, $\text{Seg}_{Out}$ is an end face area at the outlet side of honeycomb segment, $OFA_{In}$ is an opening ratio at the inlet side, and $OFA_{Out}$ is an opening ratio at the outlet side.]

When the outlet side end face area $\text{Seg}_{Out}$ of each honeycomb segment is 900 mm$^2$ or less, the ratio of the bonded material portion per unit sectional area is high, whereby the fluid passage area in the sectional area is small and the pressure loss tends to be high. When the outlet side end face area $\text{Seg}_{Out}$ of each honeycomb segment is 3,600 mm$^2$ or more, the temperature gradient between the segment center and the segment outer circumference is large and there is a fear that the difference in thermal expansion caused thereby, generates cracks in the segment.

In the present invention, the main component of the honeycomb structure is preferably at least one kind of material selected from the group consisting of cordierite, mullite, alumina, spinel, silicon carbide, silicon carbide-cordierite composite material, silicon-silicon carbide composite material, silicon nitride, lithium aluminum silicate, aluminum titanate, Fe—Cr—Al metal and combinations thereof. Silicon carbide or a silicon-silicon carbide composite material is particularly suitable as the main component of the present honeycomb structure. Here, "the main component" refers to a component constituting 50 mass % or more, preferably 70 mass % or more, more preferably 80 mass % or more of the honeycomb structure. Further, in the present invention, when the honeycomb structure is made of metal silicon (Si) and silicon carbide (SiC) and when the Si content of the honeycomb structure, specified by Si/(Si+SiC) is too low, the effect of Si addition is not obtained and, when the Si content is higher than 50 mass %, the effect of heat resistance and high heat conductivity (which are characteristics of SiC) is not obtained. The Si content is preferably 5 to 50 mass %, more preferably 10 to 40 mass %.

The cell density of each honeycomb segment is preferably 6 to 2,000 cells/in.$^2$ (0.9 to 310 cells/cm$^2$). When the cell density is less than 6 cells/in.$^2$ (0.9 cells/cm$^2$), the strength and effective GSA (geometrical surface area) to be possessed by the honeycomb segment is insufficient. When the cell density is more than 2,000 cells/in.$^2$ (310 cells/cm$^2$), the pressure loss in gas flow is large.

The thickness of each partition wall of the honeycomb segment is preferably 50 to 2,000 μm. When the thickness of the partition wall is less than 50 μm, the strength of the honeycomb segment is insufficient and, when the thickness of the partition wall is more than 2,000 μm, the effective GSA of the honeycomb segment is low and the pressure loss in gas flow is large. The sectional shape (cell shape) of each through-hole of the honeycomb segment is preferably any of triangle, tetragon and hexagon from the standpoint of the production.

In the present invention, there is no particular restriction as to the heat conductivity of the honeycomb structure. However, too high heat conductivity is not preferred because the heat radiation is too large, no sufficient temperature elevation is obtained during the regeneration, and the efficiency of regeneration is low. Too low heat conductivity gives rise to local temperature elevation during the regeneration, which tends to generate more cracks owing to a large thermal stress. The heat conductivity of the honeycomb structure is preferably 10 to 60 W/mK, more preferably 20 to 55 W/mK, most preferably 25 to 50 W/mK, at 40° C.

In the honeycomb structure of the present invention, there is no particular restriction as to the size of the honeycomb segment. However, too large honeycomb segment tends to cause breakage due to the thermal stress, and too small honeycomb segment makes complex the production or integration by bonding, of segments; therefore, such a honeycomb segment is not preferred. A preferred segment size is 900 mm$^2$ to 10,000 m$^2$, more preferably 950 mm$^2$ to 5,000 mm$^2$, most preferably 1,000 mm$^2$ to 3,500 mm$^2$ in terms of sectional area. Preferably, 70 volume % or more of the honeycomb structure is constituted by honeycomb segments of such a size. There is no particular restriction as to the shape of the honeycomb segment; however, the sectional shape is preferably tetragonal.

The honeycomb structure of the present invention is formed by integrating a plurality of honeycomb segments. The integration can be conducted using a bonding material. A preferred bonding material can be selected from the above-mentioned materials preferably used as the main component of the honeycomb structure. Explaining in detail, it is preferred to use, as the bonding material for bonding honeycomb segments, a heat-resistant ceramic fiber, a ceramic powder, a cement, etc. singly or in admixture. Further use as necessary, of an organic binder, an inorganic binder, etc. is preferred because it improves the bonding ability of bonding material. Too large a difference in thermal expansion coefficient between the bonding material and the honeycomb segment is not preferred because a thermal stress is concentrated at each bonded material portion during heating or cooling. The difference in thermal expansion coefficient from 20° C. to 800° C. between the bonding material and the honeycomb segment is preferably $1\times10^{-6}$/° C.

The material for plugging the open end of each fluid passage is preferably at least one kind of material selected from the above-mentioned ceramics and metals preferably used in the honeycomb structure and is more preferably the same material as the main component of the honeycomb structure.

When the honeycomb structure of the present invention is intended to be used, as a catalyst carrier, for exhaust gas purification in heat engine (e.g. internal combustion engine) or burner (e.g. boiler) or for reforming of liquid fuel or gaseous fuel, it is preferred that the honeycomb structure of the present invention has a catalyst (e.g. a metal having a catalytic activity) loaded thereon. As representative metals having a catalytic activity, Pt, Pd and Rh can be mentioned. Preferably, at least one kind of these metals is loaded on the honeycomb structure.

Next, the method for producing the honeycomb structure of the present invention is described.

As the raw material powder for the honeycomb structure, the above-mentioned preferred material (e.g. a silicon carbide powder) is used. Thereto is added a binder, for example, methyl cellulose and hydroxypropoxy methyl cellulose. Further, a surfactant and water are added to prepare a plastic clay. The clay is extruded using a die capable of forming a honeycomb segment of the present invention, that is, a honeycomb segment constituted by two kinds of cells different in end face sectional area, to obtain a honeycomb segment having an intended shape.

The honeycomb segment is dried using, for example, a microwave or hot air; then is plugged, at either open end of each through-hole, with the same material as used in production of the honeycomb structure, in such a way that each end face of the honeycomb segment looks like a checkered pattern; is further dried; then, is subjected to debinder with heating in, for example, a $N_2$ atmosphere; thereafter, is fired in an inert atmosphere (e.g. Ar) to obtain a honeycomb segment of the present invention. The honeycomb segment can also be obtained by cutting the outer circumference of a conventional honeycomb segment. A plurality of the thus-obtained honeycomb segments are bonded with, for example, a ceramic cement, dried, for example, at 200° C. for hardening, to obtain a honeycomb structure of the present invention.

The loading of a catalyst on the thus-produced honeycomb structure can be conducted by a method ordinarily used by those skilled in the art. For example, a catalyst slurry is wash-coated, followed by drying and firing, whereby a catalyst can be loaded.

EXAMPLES

The present invention is described specifically below by way of Examples. However, the present invention is in no way restricted to these Examples.

Example 1-1-1

A mixed powder consisting of 75 mass % of a SiC powder and 25 mass % of a metal Si powder was used as a raw material. Thereto were added methyl cellulose, hydroxypropyl methyl cellulose, a surfactant and water to produce a plastic clay. The clay was extruded; the extrudate was pressed by using a pressing plate placed from the inlet side end face to a point of 5 mm therefrom, to reduce the sectional size of the segment; then, the resulting segment was dried with a microwave and hot air to obtain a honeycomb segment having a porosity of 43%, an average pore diameter of about 10 μm, a partition wall thickness of 10 mil, and a cell density of 47 cells/cm² (300 cells/in.². The honeycomb segment was plugged at each end face with the same material as used in production of honeycomb structure in such a way that each through-hole of the honeycomb segment was plugged at one of either open end and each end face of the honeycomb segment had a checkered pattern; and the plugged honeycomb segment was dried, then subjected to debinder at about 400° C. in an $N_2$ atmosphere, thereafter fired at about 1,550° C. in an Ar inert atmosphere, to obtain a honeycomb segment of Si-bonded SiC. A plurality of such honeycomb segments were bonded with a mixture of an aluminosilicate, a silicon carbide powder, a silica gel, an organic binder and an inorganic binder; and the bonded honeycomb segments were dried at 200° C. for hardening and then subjected to cutting, to obtain a columnar honeycomb structure for DPF, having a diameter of 144 mm and a length of 152 mm. In the columnar honeycomb structure, the inlet OFA was 0.436%, the outlet OFA was 0.258%, the α was 0.05, the segment area was 1,246.1 mm², the $W_{In}$ was 1.04 mm, and the $W_{Out}$ was 1.00 mm.

Incidentally, besides the above, there is a method (using a pressing plate) of making smaller the size from the outlet toward the inlet in a tapered shape, or a method of changing the drying condition between the outlet side and the inlet side.

The above-obtained honeycomb structure was subjected to the following evaluation tests. The results are shown in Table 1.

[Tightening Strength at Breakage]

Figure 7:
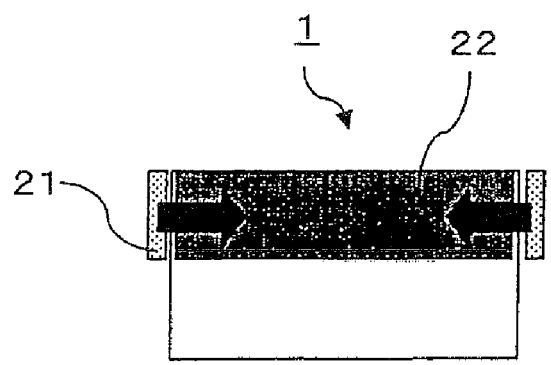
FIG. 7 is a sectional view showing a state of the tightening test.
Figure 8:
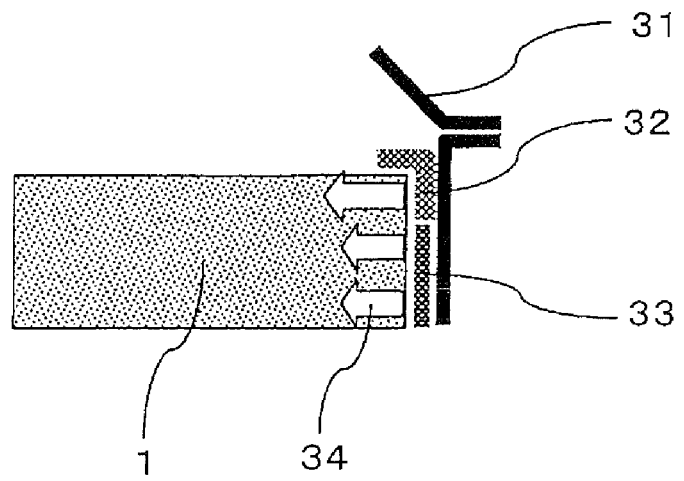
FIG. 8 is a sectional view showing a state in which a DPF has been canned.

As shown in FIGS. 7 and 8, a belt 21 of 5 mm in width is wound round the plugged portion 22 of a honeycomb structure 1; and the tightening strength of the belt 21 is increased to measure a tightening strength when the end face of the honeycomb structure 1 causes breakage.

[Particle Amount at Breakage]

In an exhaust gas line of 2.0-liter diesel engine are provided a DOC (an oxidation catalyst) and a honeycomb structure of the present invention as a DPF, in this order. The engine is operated at 1,700 rpm at 90 Nm and post-injection is employed, whereby the gas temperature at the inlet of the DPF is elevated. The inside temperature of the DPF is increased and the particles deposited inside the DPF are burnt. When the pressure loss before and after the DPF begins to decrease, the post-injection is stopped and the engine operation is switched to idling, whereby the oxygen concentration in the exhaust gas increases, the flow amount of the exhaust gas decreases, and the temperature inside the DPF rises suddenly. After this test, the DPF is removed from the engine and the formation of cracks at the outlet side end face of the DPF is examined using an optical microscope. When there is formation of cracks, the particle amount deposited at this test is defined as "particle amount at breakage".

Example 1-1-2

A columnar honeycomb structure was produced in the same manner as in Example 1-1-1 except that the α was 0.30 and the $W_{In}$ was 1.23. The honeycomb structure were tested for tightening strength at breakage and particle amount at breakage. The results are shown in Table 1. Incidentally, this Example 1-1-2 corresponds to Example 1-2-1 and Example 1-3-1 both explained later.

Comparative Example 1-1

A columnar honeycomb structure was produced in the same manner as in Example 1-1-1 except that the α was 0.70 and the $W_{In}$ was 1.53. The honeycomb structure were tested for tightening strength at breakage and particle amount at breakage. The results are shown in Table 1. In this Comparative Example, the results of the tests for tightening strength at breakage and particle amount at breakage were good, but the opening ratio of cells was too small and the pressure loss was large.

Examples 1-2-2 to 1-2-4

Columnar honeycomb structures were produced in the same manner as in Example 1-1-2 except that the inlet OFA, the outlet OFA and the inlet $W_{In}$ were changed. These honeycomb structures were tested for tightening strength at breakage and particle amount at breakage. The results are shown in Table 1.

Examples 1-3-2 to 1-3-5 and Comparative Example 1-3

Columnar honeycomb structures were produced in the same manner as in Example 1-1-2 except that the end face areas of each segment were changed. These honeycomb structures were tested for tightening strength at breakage and particle amount at breakage. The results are shown in Table 1.

Comparative Example 1

A columnar honeycomb structure was produced in the same manner as in Example 1-1-1 except that the α was 0 and the $W_{In}$ was 1.04. The honeycomb structure were tested for tightening strength at breakage and particle amount at breakage. The results are shown in Table 1.

Reference Example 1

There was produced a columnar honeycomb structure having the same opening ratio and the same bonded width, at the inlet side and at the outlet side. The honeycomb structure was tested for tightening strength at breakage and particle amount at breakage. The results are shown in Table 1.

Examples 2-1 and 2-2, Comparative Example 2-1, Comparative Example 2 and Reference Example 2

Honeycomb structures of Examples 2-1 and 2-2 and Comparative Example 2-1 were produced by setting the partition wall thickness at 12 mil and changing the α and $W_{In}$. There were also produced a honeycomb structure of Comparative Example 2 of α=0, and a honeycomb structure of Reference Example 2 having the same opening ratio and the same bonded width, at the inlet side and at the outlet side. These honeycomb structures were tested for tightening strength at breakage and particle amount at breakage. The results are shown in Table 1.

Examples 3-1 and 3-2, Comparative Example 3 and Reference Example 3

Honeycomb structures of Examples 3-1 and 3-2 and Comparative Example 3 were produced by setting the partition wall thickness at 15 mil and changing the α and $W_{In}$. There was also produced a honeycomb structure of Reference Example 3 having the same opening ratio and the same bonded width, at the inlet side and at the outlet side. These honeycomb structures were tested for tightening strength at breakage and particle amount at breakage. The results are shown in Table 1.

Examples 4-1-1 and 4-1-2 and Comparative Example 4-1

Honeycomb structures of Examples 3-1 and 3-2 and Comparative Example 3 were produced by setting the partition wall thickness at 15 mil and the cell density at 160 cpsi and changing the α and the $W_{In}$. There was also produced a honeycomb structure of Reference Example 3 having the same opening ratio and the same bonded width, at the inlet side and at the outlet side. These honeycomb structures were tested for tightening strength at breakage and particle amount at breakage. The results are shown in Table 1.

Examples 4-2-2 and 4-2-3 and Reference Example 4

Honeycomb structures of Comparative Examples 4-2-2 and 4-2-3 were produced by setting the partition wall thickness at 15 mil and the cell density at 160 cpsi and changing the inlet OFA, the outlet OFA and the inlet $W_{In}$. There was also produced a honeycomb structure of Reference Example 3 having the same opening ratio and the same bonded width, at the inlet side and at the outlet side. These honeycomb structures were tested for tightening strength at breakage and particle amount at breakage. The results are shown in Table 1.

TABLE 1

| No. | Partitionwall thickness (mil) | Cell density (cspi) | Inlet OFA (%) | Outlet OFA (%) | (1-OFA$_{In}$/ 1-OFA$_{Out}$) | α | Segment end face area (mm²) | $W_{In}$ (mm) | $W_{Out}$ (mm) | Tightening strength at breakage (MPa) | Particle amount at breakage (g/L) |
|---|---|---|---|---|---|---|---|---|---|---|---|
| Ex. 1-1-1 | 10 | 300 | 0.436 | 0.258 | 0.760 | 0.05 | 1246.1 | 1.04 | 1.00 | 9.2 | 10.2 |
| Ex. 1-1-2 (1-2(3)-1) | 10 | 300 | 0.436 | 0.258 | 0.760 | 0.30 | 1246.1 | 1.23 | 1.00 | 10.2 | 10.3 |
| C. Ex. 1-1 | 10 | 300 | 0.436 | 0.258 | 0.760 | 0.70 | 1246.1 | 1.53 | 1.00 | 12.5 | 10.3 |
| Ex. 1-2-2 | 10 | 300 | 0.458 | 0.238 | 0.712 | 0.30 | 1246.1 | 1.21 | 1.00 | 9.7 | 10.3 |
| Ex. 1-2-3 | 10 | 300 | 0.479 | 0.220 | 0.668 | 0.30 | 1246.1 | 1.20 | 1.00 | 9.2 | 10.3 |
| Ex. 1-2-4 | 10 | 300 | 0.499 | 0.202 | 0.628 | 0.30 | 1246.1 | 1.19 | 1.00 | 8.7 | 10.3 |
| Ex. 1-3-2 | 10 | 300 | 0.436 | 0.258 | 0.760 | 0.30 | 1474.6 | 1.23 | 1.00 | 9.6 | 9.9 |
| Ex. 1-3-3 | 10 | 300 | 0.436 | 0.258 | 0.760 | 0.30 | 1962.5 | 1.23 | 1.00 | 9.4 | 9.2 |
| Ex. 1-3-4 | 10 | 300 | 0.436 | 0.258 | 0.760 | 0.30 | 2510.0 | 1.23 | 1.00 | 9.5 | 8.7 |
| Ex. 1-3-5 | 10 | 300 | 0.436 | 0.258 | 0.760 | 0.30 | 3136.0 | 1.23 | 1.00 | 9.2 | 8.2 |
| C. Ex. 1-3 | 10 | 300 | 0.436 | 0.258 | 0.760 | 0.30 | 3831.6 | 1.23 | 1.00 | 9.0 | 7.6 |
| C. Ex. | 10 | 300 | 0.436 | 0.258 | 0.760 | 0.00 | 1246.1 | 1.00 | 1.00 | 8.6 | 10.3 |
| Ref. Ex. 1 | 10 | 300 | 0.342 | 0.342 | 1.000 | — | 1246.1 | 1.00 | 1.00 | 12.3 | 10.3 |
| Ex. 2-1 | 12 | 300 | 0.427 | 0.215 | 0.730 | 0.05 | 1246.1 | 1.04 | 1.00 | 10.2 | 10.9 |
| Ex. 2-2 | 12 | 300 | 0.427 | 0.215 | 0.730 | 0.40 | 1246.1 | 1.29 | 1.00 | 11.4 | 10.9 |
| C. Ex. 2-1 | 12 | 300 | 0.427 | 0.215 | 0.730 | 0.75 | 1246.1 | 1.55 | 1.00 | 13.8 | 10.8 |
| C. Ex. 2 | 12 | 300 | 0.427 | 0.215 | 0.730 | 0.00 | 1246.1 | 1.00 | 1.00 | 9.4 | 10.8 |
| Ref. Ex. 2 | 12 | 300 | 0.314 | 0.314 | 1.000 | — | 1246.1 | 1.00 | 1.00 | 13.6 | 10.8 |
| Ex. 3-1 | 15 | 300 | 0.440 | 0.136 | 0.648 | 0.05 | 1246.1 | 1.03 | 1.00 | 13.7 | 13.2 |
| Ex. 3-2 | 15 | 300 | 0.440 | 0.136 | 0.648 | 0.30 | 1246.1 | 1.19 | 1.00 | 14.3 | 13.4 |
| C. Ex. 3 | 15 | 300 | 0.440 | 0.136 | 0.648 | 0.82 | 1246.1 | 1.53 | 1.00 | 17.6 | 13.1 |
| Ref. Ex. 3 | 15 | 300 | 0.274 | 0.274 | 1.000 | — | 1246.1 | 1.00 | 1.00 | 17.5 | 13.2 |
| Ex. 4-1-1 | 15 | 160 | 0.445 | 0.225 | 0.716 | 0.10 | 1296.0 | 1.07 | 1.00 | 13.0 | 12.4 |
| Ex. 4-1-2 (4-2-1) | 15 | 160 | 0.445 | 0.225 | 0.716 | 0.50 | 1296.0 | 1.36 | 1.00 | 14.8 | 12.5 |
| C. Ex. 4-1 | 15 | 160 | 0.445 | 0.225 | 0.716 | 0.76 | 1296.0 | 1.54 | 1.00 | 16.2 | 12.4 |
| Ex. 4-2-2 | 15 | 160 | 0.460 | 0.212 | 0.685 | 0.50 | 1296.0 | 1.34 | 1.00 | 14.2 | 12.6 |
| Ex. 4-2-3 | 15 | 160 | 0.475 | 0.199 | 0.655 | 0.50 | 1296.0 | 1.33 | 1.00 | 13.9 | 12.3 |
| Ref. Ex. 4 | 15 | 160 | 0.328 | 0.328 | 1.000 | — | 1296.0 | 1.00 | 1.00 | 15.8 | 12.6 |

As is clear from Table 1, when design change is made from a design in which the same opening ratio and the same bonded width are employed at the inlet side and at the outlet side, to a design in which the inlet cells are larger, there is a reduction in strength at breakage (see, for example, Reference Example 1 and Example 1-1-1); however, a higher strength can be obtained by making the a larger (see, for example, Example 1-1-1 and Example 1-1-2).

With respect to the end face area of honeycomb segment, a larger end face area gives a smaller particle amount at breakage, in the test for regeneration control. In Comparative Example 1-3, the reduction in particle amount is 30% or more. In the regeneration control in actual vehicle, the fluctuation of deposited particle amount (which becomes a trigger for regeneration start) is set at ±30% in many cases; therefore, a reduction of 30% or more exceeds the set tolerance and accordingly a risk of crack formation in DPF use in actual vehicle is extremely high.

INDUSTRIAL APPLICABILITY

The present invention can be used in an exhaust gas purification device for heat engine (e.g. internal combustion engine) or burner (e.g. boiler).

The invention claimed is:

1. A honeycomb structure comprising a plurality of columnar honeycomb segments in which two kinds of plural through-holes different in end face area are formed side by side by being surrounded by partition walls, each honeycomb segment having, at one end face, an inlet side of high opening ratio wherein through-holes of smaller end face area are plugged and, at other end face, an outlet side of low opening ratio wherein through-holes of larger end face area are plugged, the plurality of honeycomb segments being bonded to each other via a bonding material in the longitudinal direction of each honeycomb segment, in which honeycomb structure the bonded width of the bonding material is larger at the inlet side end face of the honeycomb structure than at the outlet side end face, wherein, in the following formula (1), $0<\alpha<0.7$ and $0.3<W_{Out}<2.5$ mm are satisfied:

$$W_{In}=\alpha\times\{(1-OFA_{In})/(1-OFA_{Out})\}+W_{Out} \quad (1)$$

where $W_{In}$ is a bonded width at inlet side, $W_{Out}$ is a bonded width at outlet side, $OFA_{In}$ is an opening ratio at inlet side, and $OFA_{Out}$ is an opening ratio at outlet side.

2. A honeycomb structure according to claim 1, wherein the end face area of each honeycomb segment is smaller at the inlet side than at the outlet side.

3. A honeycomb structure according to claim 2, wherein, in the following formula (2), $0<\alpha<0.7$ and $900<Seg_{Out}<3,600$ mm² are satisfied:

$$Seg_{In}=\alpha\times\{(1-OFA_{In})/(1-OFA_{Out})\}\times Seg_{Out} \quad (2)$$

where $Seg_{In}$ is an end face area at the inlet side of honeycomb segment, $Seg_{Out}$ is an end face area at the outlet side of honeycomb segment, $OFA_{In}$ is an opening ratio at inlet side, and $OFA_{Out}$ is an opening ratio at outlet side.

4. A honeycomb structure according to claim 1, wherein, in the following formula (2), $0<\alpha<0.7$ and $900<Seg_{Out}<3,600$ mm² are satisfied:

$$Seg_{In}=\alpha\times\{(1-OFA_{In})/(1-OFA_{Out})\}\times Seg_{Out} \quad (2)$$

where $Seg_{In}$ is an end face area at the inlet side of honeycomb segment, $Seg_{Out}$ is an end face area at the outlet side of honeycomb segment, $OFA_{In}$ is an opening ratio at inlet side, and $OFA_{Out}$ is an opening ratio at outlet side.

* * * * *